United States Patent [19]

Kezran

[11] Patent Number: 4,490,080
[45] Date of Patent: Dec. 25, 1984

[54] HOLE CUTTING TOOL

[75] Inventor: Mitchell Kezran, Providence, R.I.

[73] Assignee: Precision Industries, Inc., Providence, R.I.

[21] Appl. No.: 467,584

[22] Filed: Feb. 18, 1983

[51] Int. Cl.³ .............................................. B23B 51/04
[52] U.S. Cl. ..................................... 408/68; 408/189; 408/206; 408/703; 408/713
[58] Field of Search ................ 408/202, 207, 68, 226, 408/703, 713, 189, 203, 204, 205, 206, 209

[56] References Cited

U.S. PATENT DOCUMENTS

| 1,407,560 | 2/1922 | Maxwell | 408/203 X |
| 2,525,669 | 10/1950 | Hainault | 408/703 X |
| 3,546,980 | 12/1970 | Lemanski | 408/189 |
| 4,090,804 | 5/1978 | Haley | 408/204 X |
| 4,129,400 | 12/1978 | Wozar | 408/713 X |
| 4,129,401 | 12/1978 | Berthier | 408/703 X |
| 4,131,384 | 12/1978 | Hougen | 408/703 X |
| 4,295,763 | 10/1981 | Cunniff | 408/207 X |

FOREIGN PATENT DOCUMENTS 0607671 5/1978 U.S.S.R. ..................... 408/713 X

Primary Examiner—William R. Briggs
Assistant Examiner—Glenn L. Webb
Attorney, Agent, or Firm—Salter & Michaelson

[57] ABSTRACT

A hole cutting tool of the type operable to produce a circular hole by cutting only the circumferential areas thereof, comprising removable cutting inserts which are received in a cutting head of the tool and are engageable with a workpiece to produce a desired hole. A cooperative wedge-like relation between the inserts and wedge elements of the tool secures the inserts in slots in the cutting head and permits use of the tool in reduced sizes.

14 Claims, 14 Drawing Figures

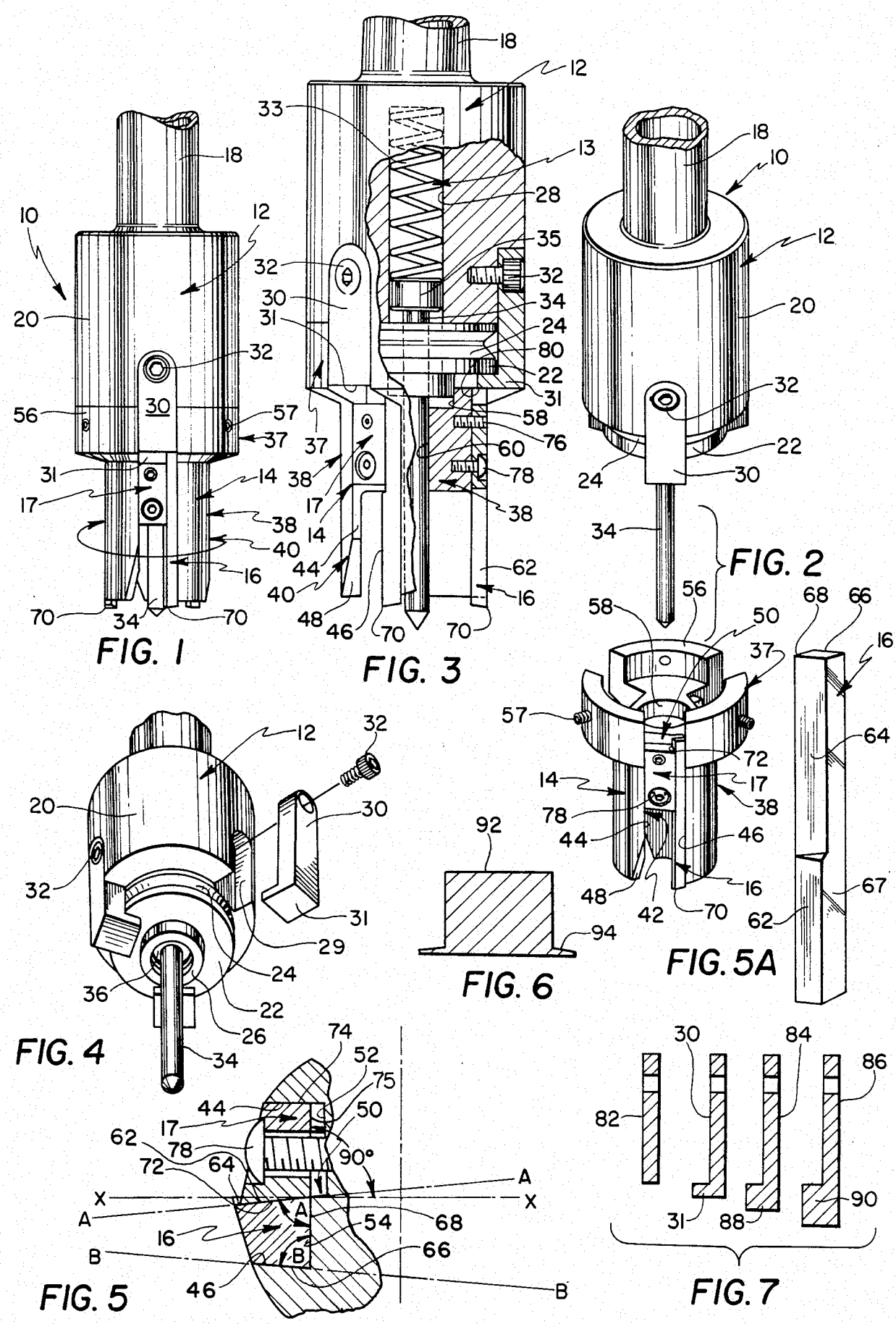
U.S. Patent   Dec. 25, 1984   Sheet 1 of 2   4,490,080

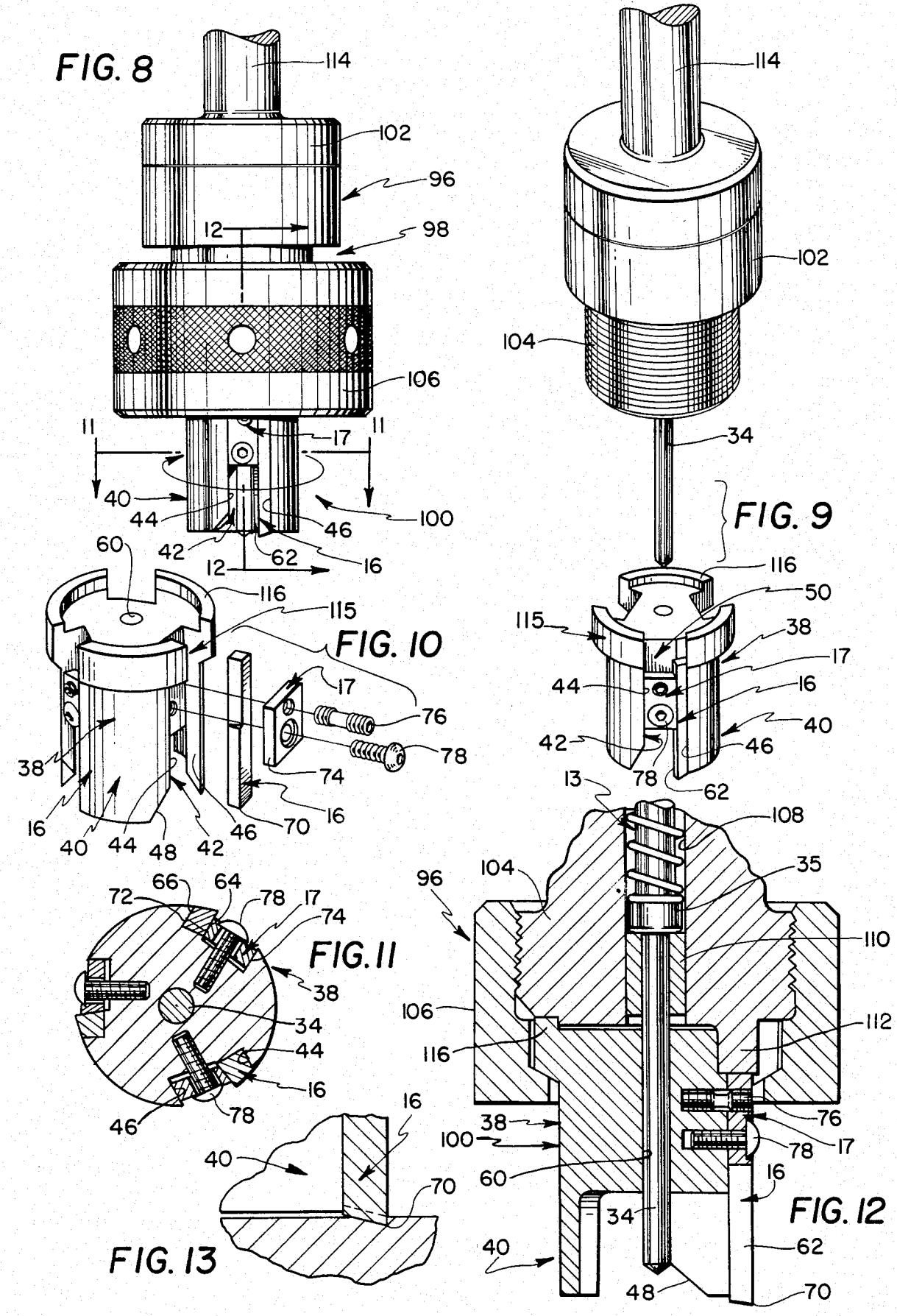

HOLE CUTTING TOOL

BACKGROUND AND SUMMARY OF THE INVENTION

The instant invention relates to hole cutting tools for metal and more particularly to a novel hole cutting tool for metal having removable cutting inserts.

Hole cutting tools for cutting circular holes in most types of materials generally fall into two major categories; those which operate by cutting or removing the entire interior area of a circle and those which operate by cutting only the circumferential areas of a circle thereby producing an interior circular plug during a cutting operation. A conventional drill is an example of the former type of tool, i.e., a drill which in effect chisels or shaves the entire interior of a circle as it rotates to produce a desired hole. A variety of different types of drills and cutting tools which operate by this general principle have heretofore been available for various applications for cutting holes of all sizes. Several types of cutting tools have also heretofore been available for cutting holes by cutting or shaving only the circumferential areas thereof, conventional hole saws and tools known as trepanning tools being exemplary in this regard. Tools of this type have advantages over conventional drilling tools by virture of the fact that they require substantially less cutting to achieve a desired hole and hence hole cutting can be effected substantially faster and with substantially less energy consumption when using these tools than when using conventional drilling tools.

The use of trepanning tools which cut only the circumferential areas of circles, to cut large diameter holes of substantial depths is widely known. In this regard, conventional trepanning tools comprise an elongated tubular cutting head having a single cutting blade or bit secured thereto which engages a work piece to shave or cut portions thereof to define the circumference of a circle upon rotation of the tool. Accordingly, as cutting of a work piece is effected, a center plug is produced which is received in the center area of the elongated tubular cutting head. The cutting of holes having depth to diameter ratios of up to 100 to 1 can be effected with tools of this type, the elongated plugs thereby produced being received in the tubular cutting heads of the respective tools. Tools of this type have been available for cutting holes having diameters ranging from approximately one inch to holes having extremely large diameters, for example up to 10 feet or more. Many of the larger trepanning tools heretofore available have been provided with removable bits or cutting inserts which can be removed for sharpening or replacement thereof to provide extended tool life. However, the use of removable bits or inserts has heretofore proven to be impractical with smaller diameter tools due to the lack of availability of the effective means for securing and retaining cutting inserts in cutting heads of smaller diameter tools. This is primarily due to the fact that the differences between the cutting speeds at the inner and outer portions of a circular cut cause resultant forces on a cutting bit or insert which tend to make it yaw outwardly. The heretofore known insert retaining means have simply been ineffective at counteracting these forces when embodied in smaller sizes and hence, the heretofore known trepanning tools having diameters of approximately three inches or less have been provided with cutting bits which are welded or brazed in place and therefore cannot be removed for sharpening or replacement. As a result, when the cutting bits of tools of this type become dull and worn, the replacement of the entire tool becomes necessary.

The instant invention relates to a novel hole cutting tool which is operable to form a shallow circular hole by cutting only the circumferential areas thereof, but which can be embodied in reduced sizes with removable cutting inserts to allow the replacement or sharpening thereof. Specifically, the hole cutting tool of the instant invention comprises a tool body which is attachable to a drive apparatus for rotating the tool about an axis, a cutting head which is attached to the body, a cutting insert which is attached to the cutting head, and means which engages the leading edge of the insert to retain it in a cutting position on the cutting head. The lower portion of the cutting head is of tubular configuration and has at least one longitudinal slot therein which extends inwardly from the terminal end thereof, the slot having leading and trailing edges as determined by the cutting rotation of the tool. The trailing edge of the slot is defined by a plane which is inwardly divergent relative to the adjacent intersecting radial plane of the cutting head, and the cutting insert has a planar seating surface which is received in abutting relation with the trailing edge of the slot. The cutting edge of the cutting insert is in substantially radial relation to the cutting head and in spaced relation to the leading edge of the slot. Accordingly, due to the geometry of the cutting insert and of the slot, when forces are applied to the end of the cutting insert during a cutting operation, the insert remains securely in position and this permits the use of the instant invention in tools for cutting holes of reduced diameters, i.e., holes having substantially smaller diameters than was possible with the heretofore known inserted hole cutting tools. In the preferred embodiment of the instant invention, the means which retains the insert in the slot comprises a retaining wedge which engages the leading edge of the slot and engages the leading edge of the insert to urge it against the trailing edge of the slot so that the insert is wedged in position with the angle of the wedge and the angle of the trailing edge of the slot preventing outward movement of the insert. Further, in the preferred embodiment, three equally circumferentially spaced slots are provided in the cutting head, each having an insert received therein, whereby high speed cutting can be effected with the tool. It has been found that tools embodying these features can be used for rapidly and effectively cutting holes having reduced diameters with a minimum of energy consumption.

Accordingly, it is a primary object of the instant invention to provide a hole cutting tool having removable cutting inserts.

Another object of the instant invention is to provide a hole cutting tool having removable cutting inserts which can be used in reduced sizes.

A still further object of the instant invention is to provide a hole cutting tool wherein a removable cutting insert is effectively retained in position by means of a wedge-like retaining member.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view of the hole cutting tool of the instant invention;

FIG. 2 is an exploded perspective view thereof;

FIG. 3 is an enlarged fragmentary sectional view thereof;

FIG. 4 is a perspective view of the body portion of the tool particularly illustrating the drive keys thereof;

FIG. 5 is a fragmentary sectional view of the upper portion of the cutting head of the tool as seen looking downwardly toward the working end of the cutting head;

FIG. 5A is an enlarged perspective view of a cutting insert;

FIG. 6 is a sectional view of a plug as formed with the cutting tool of the instant invention;

FIG. 7 is a sectional view of a plurality of different drive keys which are usable in the cutting tool of the instant invention;

FIG. 8 is an elevational view of an alternate embodiment of the cutting tool of the instant invention;

FIG. 9 is an exploded perspective view thereof without the retaining collar thereof;

FIG. 10 is an exploded perspective view of the cutting head of the tool;

FIG. 11 is a sectional view taken along line 11—11 in FIG. 8;

FIG. 12 is a sectional view taken along line 12—12 in FIG. 8; and

FIG. 13 is a fragmentary sectional view of a cutting insert of the tool shown during the cutting operation.

DESCRIPTION OF THE INVENTION

Referring now to the drawings, particularly FIGS. 1 through 7, a first embodiment of the hole cutting tool of the instant invention is illustrated and generally indicated at 10. The tool 10 generally comprises a tool body generally indicated at 12, and has which a plug rejector assembly 13 received therein, a cutting head which is generally indicated at 14, three cutting inserts each of which is generally indicated at 16, and three wedge elements 17 which engage the inserts 16 to retain them in position on the cutting head 14. During use and operation of the tool 10, the body 12 is attachable to a drive apparatus to rotate the tool 10 in a cutting direction about a longitudinal axis whereby the cutting of the circumferential areas of a desired circle may be effected utilizing the inserts 16. Although the tool 10 as herein embodied includes three cutting inserts 16 it will be understood that the tool of the instant invention can be embodied with only a single insert or with several inserts as needed to meet the demands of particular applications.

The body 12 is most clearly illustrated in FIGS. 1 through 4, and comprises an upper tubular shank portion 18, an enlarged cylindrical intermediate portion 20, and a reduced neck portion generally indicated at 22 having an annular channel or groove 24 therein. A ring 26 extends integrally downwardly from the neck portion 22 and an axial bore 28 extends upwardly through the ring 26, through the neck portion 22 and for a distance through the intermediate portion 20 terminating adjacent the upper end thereof. Three substantially equally spaced longitudinal grooves 29 are provided adjacent the lower end the intermediate portion 20, and a drive key 30 is received in each of the grooves 29, each of the drive keys 30 having an inwardly extending foot portion 31 and being retained in its respective groove 29 by means of a screw 32.

The plug rejector assembly 13 comprises a coil spring 33 which is received in the bore 28, and a pin element 34 having an enlarged head 35. The head 35 is dimensioned to travel in the bore 28 and is resiliently biased to an outwardly extended or downward position by means of the spring 33. A stop ring 36 which is secured in the lower end of the bore 28 limits the downward travel of the pin element 34.

The cutting head 14 is most clearly illustrated in FIGS. 1, 2, 3 and 5 and comprises a coupling portion generally indicated at 37, an upper or retainer portion generally indicated at 38 and a lower or working portion generally indicated at 40. The upper portion 38 is of substantially cylindrical configuration, being solid in the interior areas thereof; and the lower portion 40 is of substantially tubular configuration, being open in the interior areas thereof. The upper and lower portions 38 and 40 cooperate to define a cylindrically shaped element on the working end of the tool 10 as illustrated. Three substantially equally circumferentially spaced slots 42 extend upwardly from the lower terminal end of the head 14 extending through both the lower and upper portions 40 and 38 thereof, respectively, the slots 42 having leading and trailing substantially planar slot edge surfaces 44 and 46, respectively, as determined by the cutting rotation of the tool 10. Bevelled surfaces 48 are provided diverging outwardly from the lower portions of the leading edge surfaces 44 for reasons which will hereinafter be set forth. As will be seen most clearly from FIG. 5, as the slots 42 pass through the solid upper head portion 28, they form grooves 50 having inner peripheries which are defined by wedge lock surfaces 52 and inner insert seating surfaces 54. A downwardly extending axial recess 58 is provided in the upper head portion 38 and an axial bore 60 extends downwardly through the upper head portion 38 from the recess 58. The coupling portion 37 is preferably integrally formed with the upper head portion 38 and comprises three arcuate coupling elements 56 which are substantially evenly circumferentially spaced on the upper end of the cutting head 14, each of the elements 56 having an inwardly extending set screw 57 therein. The elements 56 are dimensioned to receive the neck portion 22 therewithin in a snugly fitting but slidable relation, and the elements 56 are spaced so that the drive keys 30 are receivable therebetween. The outer configurations of the elements 56 are preferably adapted to conform substantially to the cylindrical outer configuration of the body 12 as seen most clearly in FIG. 1.

Referring particularly to FIG. 5A, one of the inserts 16 is clearly illustrated. Each of the inserts 16 is preferably made of a hardened high speed cutting steel or carbide and has a cutting surface 62 which defines the leading edge of the lower or working end thereof, and a wedge surface 64 which defines the leading edge of the opposite or upper end thereof. The trailing edge of each of the inserts 16 is defined by a planar seating surface 66 which is generally opposite from the surfaces 62 and 64. Each of the inserts 16 also includes inner and outer surfaces 67 and 68, respectively, each of the inner surfaces 68 preferably being planar. The terminal end of each of the inserts 16 is inclined slightly inwardly towards the inner surface 68 thereof and rearwardly toward the seating surface 66 thereof whereby the lowermost extremity of each of the inserts 16 is disposed at the outermost end of the lower edge of the cutting surface 62 as indicated at 70. In this connection, the precise angles of inclination of the cutting ends of the inserts 16 are preferably determined in accordance with conventional cutting geometry technology. It has been found that preferably the inserts 16 are formed so the average dimensions thereof between the surfaces 62 and 66 are approximately equal to the average dimensions thereof between the surfaces 67 and 68 so that the inserts 16 are of square-like sectional configuration, although they are obviously asymmetrical as illustrated clearly in FIG. 5. In assembled relation, each of the inserts 16 is received in a groove 42 so that the respective seating surface 66 of the insert 16 abuts the respective trailing edge surface 46 of the respective groove 42 and so that the upper portion of the inner surface 68 of the respective insert 16 is received in mating relation with the adjacent inner seating surface 54. Longitudinally, each of the inserts 16 is positioned so that the lower or working end thereof projects slightly downwardly beyond the lower extremity of the lower portion 40.

Each of the wedge elements 17 comprises a rectangular element having a wedge surface 72, a leading surface 74 and an inner surface 75. Each of the wedge elements 17 is receivable in one of the grooves 50 to retain the adjacent insert 16 in the respective slot 42, as will hereinafter be more fully set forth. Each of the wedge elements 17 is secured in its respective groove 50 by means of upper and lower screws 76 and 78, respectively Referring now particularly to FIG. 5, the relative positions of an insert 16 and an adjacent wedge element 17 in the cutting head 14 and the angles of the various surfaces which cooperate to securely retain the insert 16 in position are clearly illustrated. In this connection, it will be seen that the seating surface 66 and the trailing edge surface 46 lie in a common plane which is designated as plane B—B, the wedge surface 64 and the wedge surface 72 lie in a plane which is designated as plane A—A, and the cutting surface 62 lies in a plane which is designated as plane X—X. It will be further seen that the angle between the plane A—A and the surface 54 has been designated as angle A and that the angle between the plane B—B and surface 54 has been designated as angle B. Referring first to plane B—B, it will be seen that as a result of the angle of plane B—B, surface 46 is inwardly divergent relative to the adjacent intersecting radial plane of the cutting head 14. Specifically, the portions of the head 14 which define the surface 46 are divergent relative to such a radial plane when moving inwardly in the head 14 from the point of intersecting of the radial plane and the surface 46. As a result, when forces are applied to the end of the insert 16 during a cutting operation, the insert 16 is urged against the trailing edge surface 46 and the angular disposition thereof causes a wedge locking effect whereby the insert 16 is prevented from traveling outwardly. To further enhance the firm retention of the insert 16 in position on the cutting head 14, the insert 16 and the groove 50 are dimensioned and formed so that when the insert 16 is in position with the seating surface 66 in abutting relation with the trailing edge surface 46, the inner surface 68 abuts the mating surface 54 with the angle A preferably being approximately 85°. When the insert 16 is in this position, the outer edge of the cutting surface 62 of the insert 16 is disposed slightly radially outwardly beyond the circumference which defines the outer surface of the lower cutting head portion 40, and the inner edge of the cutting surface 62 is disposed slightly radially inwardly from the circumference which defines the inner surface of the lower portion 40. Accordingly, the circular cut produced by the inserts 16 is wide enough to receive the walls of the lower portion 40 as a cutting operation is effected. The wedge element 17 and the insert 16 are cooperatively formed and dimensioned so that the wedge surface 64 of the insert 16 and the wedge surface 72 of the wedge element 17 meet in abutting relation along plane A—A with the angle B preferably being approximately 85°. In the preferred embodiment of the instant invention, plane A—A is disposed so that the surface 64 is at least slightly outwardly divergent (preferably at an angle of approximately 5°) relative to the the adjacent intersecting radial plane of the cutting head 14 as illustrated. In other words, the portions of the insert 16 which define the surface 64 are preferably divergent to such a radial plane when moving outwardly relative to the head 14 from the point of intersection of the radial plane and the surface 64. However, the important feature here is that planes A—A and B—B intersect at a point which is spaced outwardly from the periphery of the cutting head 14 to define an angle therebetween which is preferably approximately 10° whereby they cooperate to define an at least partially wedge shaped configuration of the insert 16, it being understood that plane B—B will always be in the above described inwardly divergent relation in the cutting head 14. Accordingly, other embodiments of the tool 10 wherein the plane A—A is not in the above described inwardly divergent disposition but wherein the planes A—A and B—B intersect at a point which is outwardly spaced from the periphery of the cutting head 14 are contemplated. The wedge element 17 is adapted to be received in a snugly fitting relation between the insert 16 and the leading edge surface 44, and accordingly, the angular dispositions of the leading and wedge surfaces 74 and 72, respectively, of the wedge element 17 are preferably complimentary relative to the leading edge surface 44 of the slot 42 and the wedge surface 64 of the insert 16, respectively. Further, the groove 50, and particularly, the wedge surface 52 thereof, and the wedge element 17 are preferably formed so that when the screws 76 and 78 are fully tightened, the wedge element 17 is in slightly spaced relation to the surface 52 whereby a tightly fitting relation between the wedge element 17 and the insert 16 is assured. In the preferred embodiment, the inner surface 75 of the wedge 17 forms an angle of approximately 90° with the plane X—X, as illustrated, although other embodiments of the wedge 17 wherein the surface 75 is at other angular dispositions are contemplated. Further, in the preferred embodiment, the cutting edge surface 62 lies in the plane X—X which is a substantially radial plane of the cutting head for reasons of optimum cutting geometry.

In assembled relation, the cutting head 14, with the inserts 16 and wedges 17 secured thereto, is received on the body 12 so that the ring 26 is received in the recess 58, so that the neck portion 22 is received within the coupling elements 56 and so that the drive keys 30 are received in the spacings between the coupling elements 56. The set screws 57 retain the head 14 on the body 12 by engaging the neck portion 22 in the anular groove 24. The pin element 34 then projects downwardly through the bore 60 into the open interior area of the lower portion 40 as illustrated most clearly in FIG. 3.

As will be seen from FIGS. 1 and 3, when the cutting head 14 is assembled on the body 12, the upper ends of the grooves 50 are defined by the foot portions 31 of the drive keys 30. Accordingly, as will be further seen, the upper ends of the inserts 16 engage the foot portions 31 as at 80 so that the drive keys 30 and the inserts 16 cooperate to longitudinally position the inserts 16 in their respective slots 42 with the respective cutting ends thereof projecting slightly beyond the working end of the lower portion 40, as hereinabove set forth. It will be understood, however, that each time the inserts 16 are sharpened, the lengths thereof will be reduced so that this cooperative relation between the drive keys 30 and the inserts 16 will be altered. For this reason, alternative drive keys 82, 84 and 86 illustrate in FIG. 7 may be provided with the tool 10 so that the proper longitudinal positioning of inserts of different lengths can be effected. Specifically, it will be seen that the drive keys 84 and 86 include enlarged foot portions 88 and 90, respectively, so that they can be used to longitudinally position inserts of shorter lengths than the inserts 16. The drive key 82 may be used to accommodate inserts of greater length than the inserts 16, in this instance the drive key 82 not having a foot portion so that the respective insert will engage the lower end of the neck portion 22.

In use and operation, the tool 10 is rotated in the direction illustrated in FIG. 1 and the tool is advanced so that the cutting ends of the inserts 16 engage a desired work piece. Accordingly, the inserts 16 effect the cutting of the circumferential areas of a desired circle, the lower portion of the inserts 16 and the lower portion 40 gradually being advanced into the work piece. As cutting is effected in this manner, an inner plug which comprises the interior areas of a desired cutting circle is formed and is progressively received in the interior of the tubular lower portion 40 causing the pin 34 to be retracted into the body 12. It will be obvious that during such a cutting operation cutting chips are produced from the work piece as the inserts 16 shave or cut the circumferential areas of the cutting circle. These chips are received in the slots 42, the bevelled surfaces 48 promoting the even passage of such chips into the upper portions of the slots 42. Further, it will be obvious that the tool 10 can be utilized to effect cutting of holes in stock of depths up to that defined by the tubular lower portion 40. After the desired hole has been cut, the plug comprising the interior areas of the circle is automatically rejected from the interior of the lower portion 40 by means of the rejector assembly 13, and specifically by the spring loaded pin 34. The plug illustrated in FIG. 6 at 92 is exemplary of a plug as formed during such a cutting operation, having bevelled lower flanges 94 which result from the configuration of the cutting ends of the inserts 16 as hereinabove described. Further, it will be understood that the tool of the instant invention can also be used in "form" trepanning and sublanding operations by varying the configuration of the inserts or by using inserts of different configurations. In addition, while it is anticipated that the tool of the instant invention will be primarily used for through hole drilling operations, the use thereof for blind hole drilling to produce circular grooves is also contemplated.

An alternate embodiment of the hole cutting tool of the instant invention is illustrated in FIGS. 8 through 13 and generally indicated at 96. The tool 96 generally comprises a body portion generally indicated at 98, a head portion generally indicated at 100, three cutting inserts 16 and three wedges 17. The tool 96 is operable in a manner similar to the tool 10 to cut a circular hole by cutting only the circumferential areas thereof.

The body portion 98 comprises an upper body portion 102 having a threaded lower end 104 having a retaining collar 106 threadedly mounted thereon. An axial bore 108 is provided in the upper portion 102 and a plug rejector assembly 13 is received therein, downward movement of the assembly 13 being limited by a stop sleeve 110 which is secured in the lower end of the bore 108. Three circumferentially spaced arcuate tabs 112, one of which is illustrated in FIG. 12, extend downwardly from the lower end of the upper body portion 102. A shaft 114 is provided on the upper end of the upper body portion 102 for the attachment thereof to a drive apparatus for rotating the tool 96 about its longitudinal axis in a cutting direction.

The cutting head 100 is similar in configuration to the cutting head 14 having the slots 42 and the upper and lower cutting head portions 38 and 40, respectively. The cutting head 100 also includes a coupling portion 115 having coupling elements 116 which are similar in configuration to the elements 56 but are of reduced height and do not include the set screws 57. The cutting head 100 also does not include the recess 58. The cutting head 100 is received on the lower end of the body portion 98 so that the arcuate tabs 112 are received between the coupling elements 116 and so that the collar 106 engages the undersides of the elements 116 to retain the cutting head 100 in assembled relation with the body portion 98 as illustrated most clearly in FIG. 12. When assembled in this manner, the longitudinal positioning of the inserts 16 is effected by the engagement of the upper ends thereof with the lower ends of the arcuate tabs 112. As illustrated in FIG. 11, the configurations of the inserts 16 and the wedge elements 17 and their positions in the cutting head 100 are similar to those of the corresponding elements in the cutting head 14. For use and operation, the tool 96 is attached to a drive apparatus and thereby rotated about its longitudinal axis to effect cutting in a manner similar to that hereinabove described for the tool 10.

It is seen therefore that the instant invention provides an effective hole cutting tool which can be embodied with removable cutting inserts for cutting holes of relatively reduced sizes. In this connection, the configuration of the slots 42, and the cooperative relation between the wedge elements 17 and the inserts 16 provides an effective means for retaining the inserts 16 in the cutting heads 14 and 100 so that they remain firmly in position and do not tend to yaw outwardly during cutting operations. Further, the effectiveness of these elements is not diminished as the sizes thereof are reduced when used in tools for cutting holes of reduced diameter. Accordingly, it is seen that the instant invention represents a significant improvement in the hole cutting tool art which has substantial commercial merit.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hole cutting tool comprising:
   a. a tool body attachable to a drive apparatus for rotating said tool in a cutting direction about an axis;
   b. a cutting head attached to said body, said cutting head having upper and lower portions concentric with said axis, said lower portion being of substantially tubular configuration and defining the lower end of said tool, said cutting head having a longitudinal slot therein which extends upwardly through said lower portion from the lower end thereof and a distance upwardly through said upper portion, said slot having leading and trailing longitudinal slot edge surfaces as determined by the cutting rotation of said tool, the trailing edge surface of said slot being substantially planar and extending across the wall thickness of said tubular lower portion, the trailing edge surface of said slot in both said upper and lower cutting head portions being in a plane which diverges at least slightly in its inward extent relative to an adjacent radial plane of said cutting head which intersects said trailing edge surface;
   c. an elongated cutting insert having a substantially planar seating surface which is received in abutting relation with said trailing edge surface in both said upper and lower cutting head portions and having a leading edge as determined by the cutting rotation of said tool which includes a substantially planar cutting surface, said cutting surface being disposed in substantially radial relation to said cutting head and in spaced relation to said slot leading edge surface, the terminal portion of said insert projecting slightly beyond the terminal end of said cutting head, the terminal end of said insert slanting at least slightly upwardly from the cutting surface edge thereof to the seating surface edge thereof;
   d. inner positioning means disposed in said head upper portion engaging the upper portion of said insert to prevent inward movement thereof in said head; and
   e. means engaging the leading edge of the upper portion of said insert to urge said insert into engagement with the trailing edge surface of said slot and thereby retain said insert in said slot.

2. In the tool of claim 1, said inner positioning means comprising a solid interior portion of said upper head portion adjacent said slot, said solid interior portion defining an inner seating surface which is in communication with said slot and cooperates therewith to define a longitudinal groove in said upper head portion, the upper portion of said insert being received in said groove in engagement with said inner seating surface to prevent the inward movement of said insert in said head.

3. In the tool of claim 2, said insert retaining means being received in said groove and engaging the upper portion of said insert.

4. In the tool of claim 3, said insert retaining means further characterized as:
   (a) a wedge which is received in said groove and is interposed in engagement in a wedge-like relation between said leading edge surface of said slot and said insert to retain said insert in said groove; and
   (b) means retaining said wedge in said groove.

5. In the tool of claim 4, said cutting surface defining the leading edge of the lower portion of said insert as determined by the cutting rotation of said tool, the leading edge of the upper portion of said insert being defined by a substantially planar wedge surface which diverges at least slightly in its outward extent relative to an adjacent radial plane of said cutting head which intersects said wedge surface, said wedge engaging said wedge surface in abutting relation to retain said insert.

6. In the tool of claim 1, the lower portion of said slot leading edge surface being bevelled outwardly relative to said slot trailing edge surface.

7. In the tool of claim 5, said insert wedge surface diverging at an angle of approximately 5°.

8. In the tool of claim 7, the plane of said seating surface being at at angle of approximately 10° relative to the plane of said insert wedge surface.

9. In the tool of claim 1, said insert terminal end tapering slightly upwardly from its outer edge to its inner edge.

10. In the tool of claim 4, the leading and trailing edges of said wedge as defined by the cutting rotation of said tool being outwardly divergent relative to each other.

11. The tool of claim 1, further comprising an axial center pin which, and means operable to actuate said pin to reject a plug from said outer head portion, said plug being of the type formed during the use of said tool to effect cutting.

12. In the tool of claim 11, said actuating means comprising a spring biasing said pin toward the lower end of said head.

13. In the tool of claim 1, said cutting head being removably attached to said body.

14. In the tool of claim 1, the average dimension of said insert between the inner and outer surfaces thereof being approximately equal to the average dimension of said insert from said cutting surface to said seating surface thereof.

* * * * *